(No Model.)
F. E. DUCKHAM.
PNEUMATIC GRAIN CONVEYER.
No. 462,539. Patented Nov. 3, 1891.
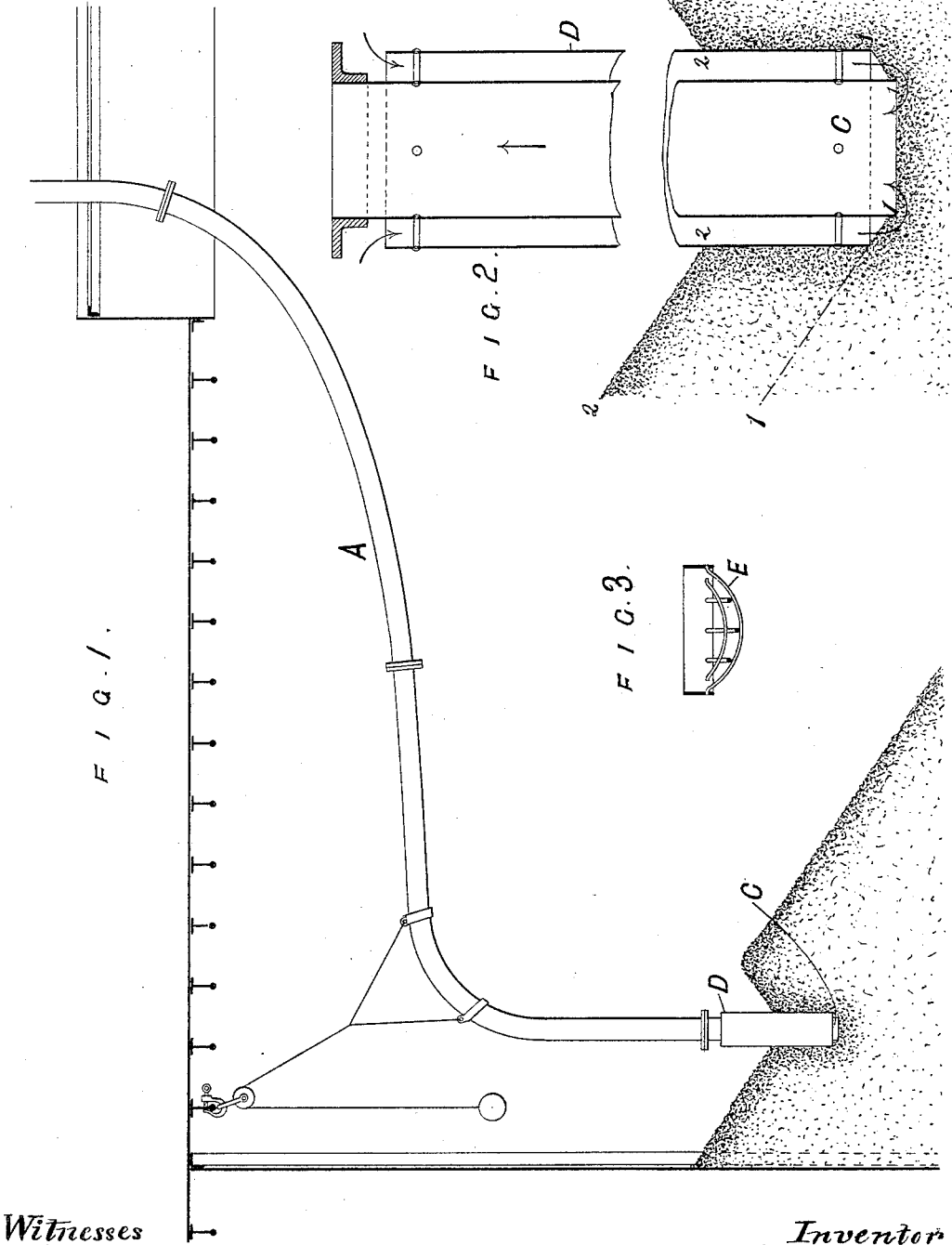
Witnesses
C. Sedgwick
E. M. Clark
Inventor
F. E. Duckham
by Munn & Co.
Attorneys.

UNITED STATES PATENT OFFICE.

FREDERIC ELIOT DUCKHAM, OF LONDON, ENGLAND.

PNEUMATIC GRAIN-CONVEYER.

SPECIFICATION forming part of Letters Patent No. 462,539, dated November 3, 1891.

Application filed March 6, 1891. Serial No. 384,013. (No model.)

*To all whom it may concern:*

Be it known that I, FREDERIC ELIOT DUCKHAM, engineer, of Millwall Docks, London, England, have invented new and useful improvements in conveying grain and other matters in and between warehouses or granaries and vessels, or other conveyers or receptacles, of which the following is a full, clear, and exact description.

My invention relates to pneumatic apparatus for use in unloading or conveying grain and other matters in or between warehouses, granaries, ships, barges, bins, or other receivers by the carrying power of a current of air, and particularly for discharging grain in bulk from awkward and confined places on board ship, or for discharging and keeping separate different parcels of grain shipped in superposed layers separated only by mats, canvas, or boards, as is commonly practiced.

My invention relates to the means whereby the admission of air in sufficient quantity to the mouth of the suction-pipe is insured, in order that the individual grains may be suspended or caused to float in the current and avoid choking of the suction-pipe.

Reference is to be had to the accompanying drawings, forming part of this specification, wherein—

Figure 1 is a general view of the apparatus as applied to work on board ship. Fig. 2 is a detail section of the suction-nozzle, and Fig. 3 is a detail.

A is the suction-pipe terminating in a suction or inlet-nozzle C, the part of the pipe which is to be led through the ship's hatchway or side port being flexible and prevented from collapse under atmospheric pressure by a wire coil in the thickness of the material of the tube. The nozzle C is surrounded at a distance by an outer sleeve D, terminating at its lower end at such a distance above the level of the inlet-mouth that a straight line 1 1 radial to the vertical axis of the nozzle and parallel to the angle of repose 2 2 of the grain and touching the edge of the sleeve D will intersect the side of the nozzle C at a given distance (say one-half or three-fourths of an inch, more or less) above its edge, such that there will always be a constant depth of grain, through which the air passing from the sleeve to the nozzle must force itself in order that the air shall carry along with it the particles of grain constantly flowing down and intervening between the apertures of the sleeve and nozzle. The depth of the constantly-renewed grain so interposed cannot however be exceeded, whatever may be the depth of the immersion of the nozzle and sleeve, so that the air will always be in sufficient quantity to provide for the efficient carriage of the grain. The relative proportion of the sleeve D to the nozzle C should be such that from twenty-two to twenty-four volumes of air at atmospheric pressure will be admitted for each volume of grain, so as to maintain a sufficient carrying current and prevent choking of the pipe, which would arise by forcing into it a more or less compact mass of grain. The sleeve is carried up a sufficient height so that its upper open end will never be immersed in or obstructed by the grain. The lower part of the sleeve need only be of annular form and the upper part may be in the form of a pipe or pipes.

Any suitable arrangement of tackle may be employed for supporting and counterweighting the pendent nozzle, so that it may be swung about or traversed where required and be readily raised and lowered.

E is a cage or fender, which may be applied to the lower end of the inlet-nozzle C to keep mats, &c., dividing the parcels of grain beyond the influence of the suction while allowing the grain to pass freely.

In moving the inlet-nozzle from place to place a flexible disk of india-rubber may be temporarily applied over the mouth of the nozzle to prevent loss of vacuum.

Having now particularly described and ascertained the nature of the said invention and in what manner the same is to be performed, I declare that what I claim is—

In a pneumatic grain-conveying apparatus, the combination, with the suction-pipe inlet-nozzle, of a circumferential sleeve inclosing an air-passage opening above the level of immersion of said nozzle, and terminating at such a height above the inlet-orifice of the nozzle that a radial line touching the ends of the nozzle and sleeve will make a lesser angle with the axis of the nozzle than the angle of repose of the grain, substantially as specified.

Signed by me this 13th day of February, 1891.

FREDERIC ELIOT DUCKHAM.

Witnesses:
W. J. NORWOOD,
WALTER J. SKERTEN,
*Both of* 17 *Gracechurch Street, London, England, Notary's Clerks.*